(12) United States Patent
Baron

(10) Patent No.: US 6,260,851 B1
(45) Date of Patent: Jul. 17, 2001

(54) COMPOSITE GASKET AND ASSEMBLY COMPRISING SUCH A GASKET

(75) Inventor: Daniel Baron, Fontenay-sur-Eure (FR)

(73) Assignee: Manuli Auto France (FR)

( * ) Notice: Subject to any disclaimer, the term of this patent is extended or adjusted under 35 U.S.C. 154(b) by 0 days.

(21) Appl. No.: 09/066,455

(22) PCT Filed: Oct. 30, 1996

(86) PCT No.: PCT/FR96/01705

§ 371 Date: Apr. 30, 1998

§ 102(e) Date: Apr. 30, 1998

(87) PCT Pub. No.: WO97/16670

PCT Pub. Date: May 9, 1997

(30) Foreign Application Priority Data

Oct. 30, 1995 (FR) .................................................. 95 12797

(51) Int. Cl.[7] .................................................. F16L 21/05
(52) U.S. Cl. .................... 277/603; 277/607; 285/351; 285/918
(58) Field of Search .................... 277/602, 603, 277/607, 616, 619, 624, 626, 627, 632, 637, 638, 642, 651, 648; 285/319, 351, 918

(56) References Cited

U.S. PATENT DOCUMENTS

| | | | |
|---|---|---|---|
| 3,061,321 | * 10/1962 | Smith | 277/180 |
| 3,325,174 | * 6/1967 | Weaver | 277/607 X |
| 3,834,744 | * 9/1974 | Masatchi | 285/373 |
| 4,799,512 | * 1/1989 | Sarson | 277/626 X |
| 4,915,136 | * 4/1990 | Bartholomew | 277/616 X |
| 5,171,028 | * 12/1992 | Bartholomew | 277/619 |
| 5,338,073 | * 8/1994 | Washizu et al. | 285/319 |
| 5,378,024 | * 1/1995 | Kumagai et al. | 285/319 X |
| 5,423,577 | * 6/1995 | Ketcham | 285/918 |
| 5,609,370 | * 3/1997 | Szabo et al. | 285/351 |
| 5,716,051 | * 2/1998 | Cornea et al. | 277/616 X |

\* cited by examiner

Primary Examiner—Robert J. Sandy
Assistant Examiner—Karlena D. Schwing
(74) Attorney, Agent, or Firm—Larson & Taylor, PLC

(57) ABSTRACT

A composite gasket (1) arranged to be frictionally fitted around a rigid tube end (2) is designed for insertion into a part (3) provided with an aperture (4) in the form of a cylindrical bore for coupling with the tube end. The gasket includes at least one ring (5) made of an elastomeric material and at least one collar (6) made of a rigid material in the shape of a cylindrical sleeve parallel to and coaxial with the ring axis. The collar is adjacent to the ring and has an outer surface (9) suitable for mild frictional engagement with the inner surface (10) of the coupling aperture, while the shape of the ring-engaging end surface of the collar matches that of the ring.

14 Claims, 4 Drawing Sheets

COMPOSITE GASKET AND ASSEMBLY COMPRISING SUCH A GASKET

The present invention relates to a composite gasket designed to be slipped frictionally onto a rigid pipe connector capable of being inserted into a component provided with an orifice for connection to the connector, the gasket comprising at least one collar made from elastomeric material.

It also relates to a component/pipe assembly comprising such a gasket.

It has a particularly important, albeit not exclusive, use in the field of the couplings of cooling circuits, air conditioning circuits and/or power steering systems of automobiles.

Such a coupling may be, for example, of the removable and/or snap-fastenable type.

Gaskets of leaktight couplings and/or of removable couplings between a tube end and a mechanical component are already known.

However, known gaskets have disadvantages, since they do not always ensure good leaktightness.

In fact, the prior art teaches essentially O-ring gaskets inserted in grooves of the tubular connector, the outside diameter of which does not always make it possible to insert them without play into the connecting orifice, in view of the tolerance dimensions for machining the components.

The object of the present invention is to provide a gasket which satisfies practical requirements better than those previously known, in particular in that it allows simple assembly which is easy to carry out and which does not entail any risk of damage to the gasket by the fitter, and in that it ensures an optimized connection between the connector and the orifice, along with much better dimensional tolerance than that obtained in the prior art, thus making it possible to ensure better leaktightness of the coupling.

To achieve this object, the present invention provides, in particular, a composite gasket designed to be slipped frictionally onto a rigid pipe connector capable of being inserted into a component provided with an orifice in the form of a cylindrical bore for connection to said connector, said gasket comprising at least one collar made from elastomeric material, characterized in that it comprises, furthermore, at least one ring made from rigid material, in the form of a cylindrical sleeve located in the extension of the collar parallel to and with an axis coinciding with the axis of the collar, said ring having an outer surface capable of cooperating by soft friction with the inner face of the connecting orifice, the junction end of the ring with the collar having a shape complementary to that of the collar so as to match at least partially the shape of the edge of said collar.

Advantageous embodiments make use, moreover, of either or both of the following arrangements:
the ring has an inner surface capable of cooperating by soft friction with the outer face of the connector;
the ring is integral with the collar made from elastomeric material;
the gasket comprises two collars made from elastomeric material, located respectively on either side of the ring;
the gasket comprises two rings made from rigid material;
the rings are connected to one another by means of one of said collars made from elastomeric material, with which said rings are integral, at least one of said rings comprising at its other end the other gasket made from elastomeric material;
the collar or collars are O-rings;
the collar is made from elastomeric material in the form of an elongate 8;
the collar comprises an end part in the form of portions of a cylinder which are arranged angularly about the axis of the gasket and which cooperate with the inner face of the ring.

The invention also provides a component/pipe assembly comprising a composite gasket of the type described above. It also provides a component/pipe assembly with a composite gasket of the type described above, characterized in that the rigid pipe connector comprises a first part projecting relative to the outer face of the pipe, said first part being located at a distance from the end of the pipe, and a second projecting part located at the end of said pipe, said projecting parts forming longitudinal blocking stops on either side of the gasket on the pipe connector.

Advantageously, there is longitudinal play allowing the gasket (forming a sleeve) to slide longitudinally slightly relative to the pipe between the two blocking stops.

Sliding completes and optimizes the compressive force of the gaskets in proportion to the pressure exerted.

The invention also provides a component/pipe assembly comprising a composite gasket, as described above, characterized in that the connector comprises at least one annular groove, into which the collar made from elastomeric material is inserted at least partially.

The present invention will be understood better from a reading of the following description of particular embodiments given by way of nonlimiting examples.

It refers to the accompanying drawings in which.

Figure 1:
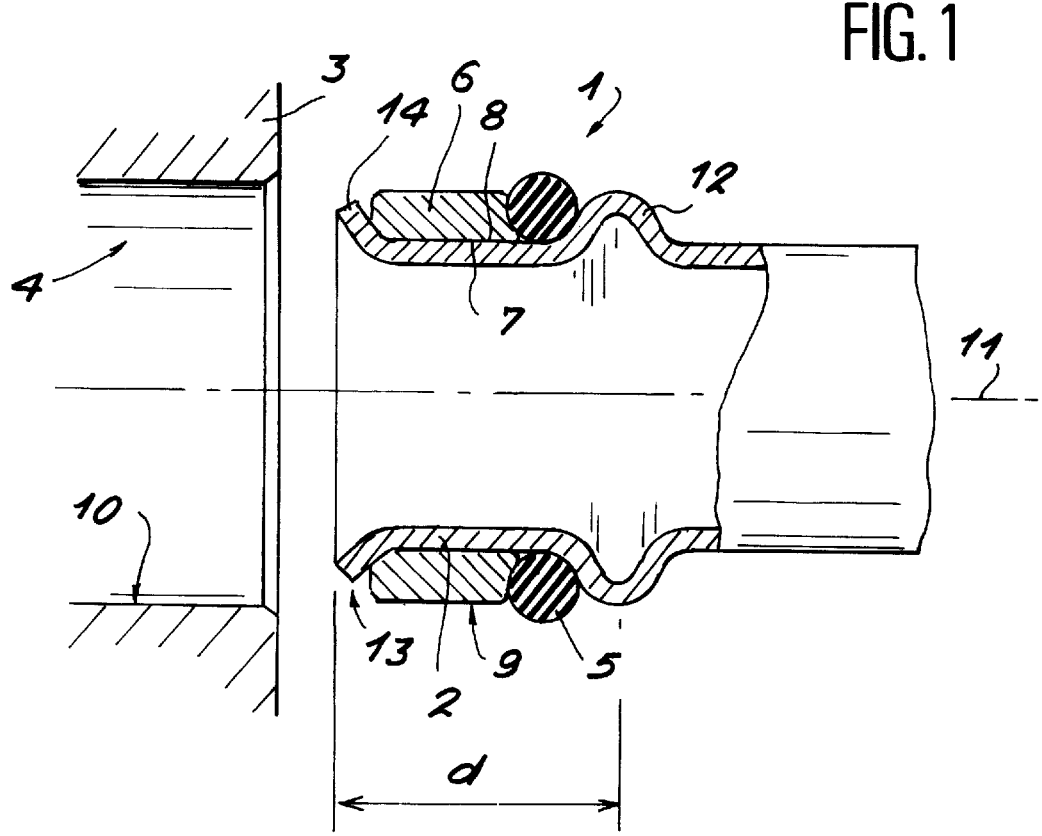
FIG. 1 is a sectional view of a composite gasket slipped onto a pipe connector belonging to a component/pipe assembly according to the invention.

FIG. 1 shows a composite gasket 1 slipped frictionally onto a rigid pipe connector 2, made from aluminum for example, capable of being inserted into a component 3 provided with a cylindrical orifice or bore 4 for connection to the connector 2.

The gasket comprises a collar made from elastomeric material, for example an O-ring 5 made from rubber.

The composite gasket 1 comprises, furthermore, a ring 6 made from rigid material, for example from steel or rigid plastic, in the form of a cylindrical sleeve, that is to say of a height greater than its thickness, for example between 1.5 and 5 times said thickness, for example of the order of 2 to 3 times greater, said ring being located next to and in the longitudinal extension of the collar which, in the free state, has a thickness greater than the thickness of the sleeve.

The end of the ring 6 is, for example, of partially annular shape or, more generally, of a shape complementary to that of the collar 5 in order partially to match the shape of the edge of said collar.

In another embodiment, the connecting face between the ring and collar is, for example, straight, that is to say perpendicular to the axis of the collar.

The ring is secured unremovably to the collar 5, for example by adhesive bonding, overmolding or vulcanization during the production of the gasket, in the longitudinal extension of the ring.

The ring 6 has a cylindrical inner surface 7 cooperating frictionally, for example by soft friction, with the outer surface 8 of the pipe connector, and an outer surface 9 capable of cooperating by soft friction with the inner face 10 of the connecting orifice.

By soft friction is meant adherence to dimensional tolerances between the bore and the ring which is designed so that the distance between their two surfaces facing one another is between 0.05 mm and 0.22 mm.

This results in an excellent fit between the bore and the connector provided with its gasket.

The axes of the collar in the form of an O-ring 5 and of the ring 6 coincide with the axis 11 of the pipe, onto the connector of which the composite gasket 1 is slipped.

The elastomeric material may also be, for example, an elastomer with a butyl or HNBR chain.

It may be replaced by an equivalent material, provided that it has high elasticity.

The collar, of constant cross section, extends, for example, on either side of the inner face 7 and outer face 9 of the ring or is substantially tangent to the longitudinal extension of the inner face 7 of the ring, and, in the free state, projects, for example by a few tenths of a millimeter, relative to the outer face 9 of the ring 6.

As regards the ring, this may be a ring made from aluminum, steel, galvanized steel or another rigid material (for example, plastic), with a tolerance of fit of the type H7g6, with the bore having, for example, a nominal diameter of 12 mm, 15.3 mm, 18.23 mm or 21.4 mm, the pipe connector being itself, for example, of outside diameter 8.5 mm, 11.7 mm, 14.7 mm or 17.8 mm.

In the embodiment more particularly described here, the component/pipe assembly is, for example, such that the rigid pipe connector 2 is metallic (it may also be made from another type of material, for example from rigid plastic) and comprises a first part 12 projecting relative to the outer face 8 of the pipe, for example being obtained by bending the wall of the pipe.

The projection is located at a distance d from the end 13 of the pipe, d being greater than the total height (longitudinal dimension) of the composite gasket, for example by a few millimeters, for example by 2 mm.

The connector also comprises a second projecting part 14 located at the end 13 of the pipe and obtained, for example, by widening said end over a thickness smaller than that of the ring 6.

The projecting parts 12 and 14 thus form annular or conical longitudinal locking stops on either side of the gasket on the pipe connector, said stops having a maximum diameter smaller than the outside diameter of the ring 6.

The pipe is secured to the component 3 by means of a plate (not shown) made integral with the connector and secured to the component, for example, by means of bolts or any other known securing means (not shown).

Figure 2:
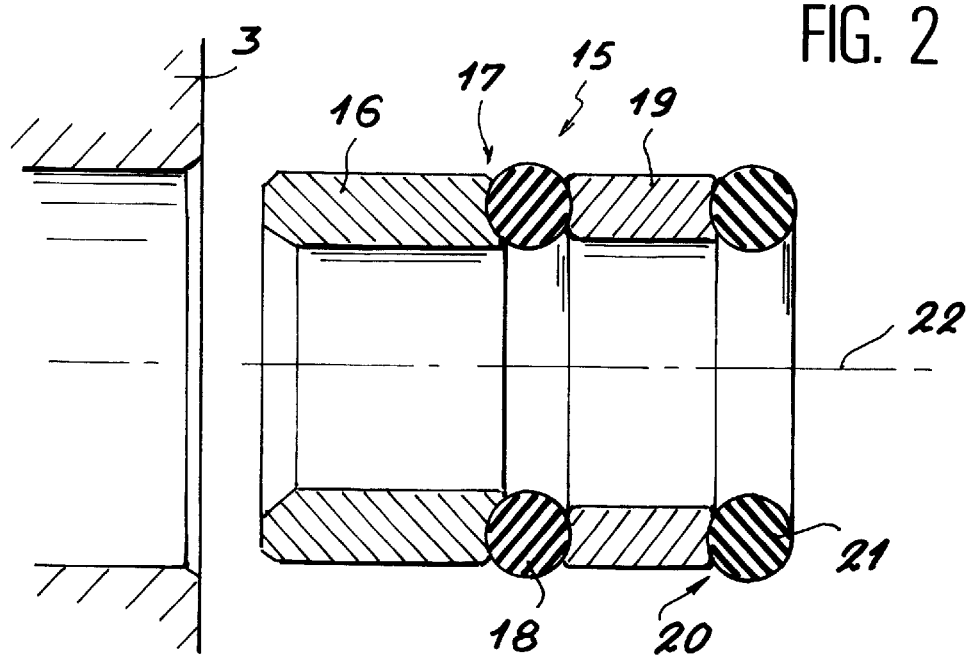
FIG. 2 is a view in longitudinal section of a composite gasket according to another embodiment of the invention.

FIG. 2 shows another embodiment of a gasket 15 according to the invention, comprising a first ring 16, of which the end 17, for example in the form of a portion of a cylinder, is integral with a first O-ring 18 which, moreover, is integral, on its other side, with a second ring 19, itself comprising at its other end 20 a second gasket 21 made from elastomeric material, the rings and the gaskets having an identical axis 22, the diameter of the gaskets 18 and 21 being greater than the thickness of the rings 16 and 19.

The rings 16 and 19 have, for example, identical dimensions.

One of the rings may also have a smaller dimension than the other, for example have a height equal to ⅔ of the height of the other ring.

Figure 3:
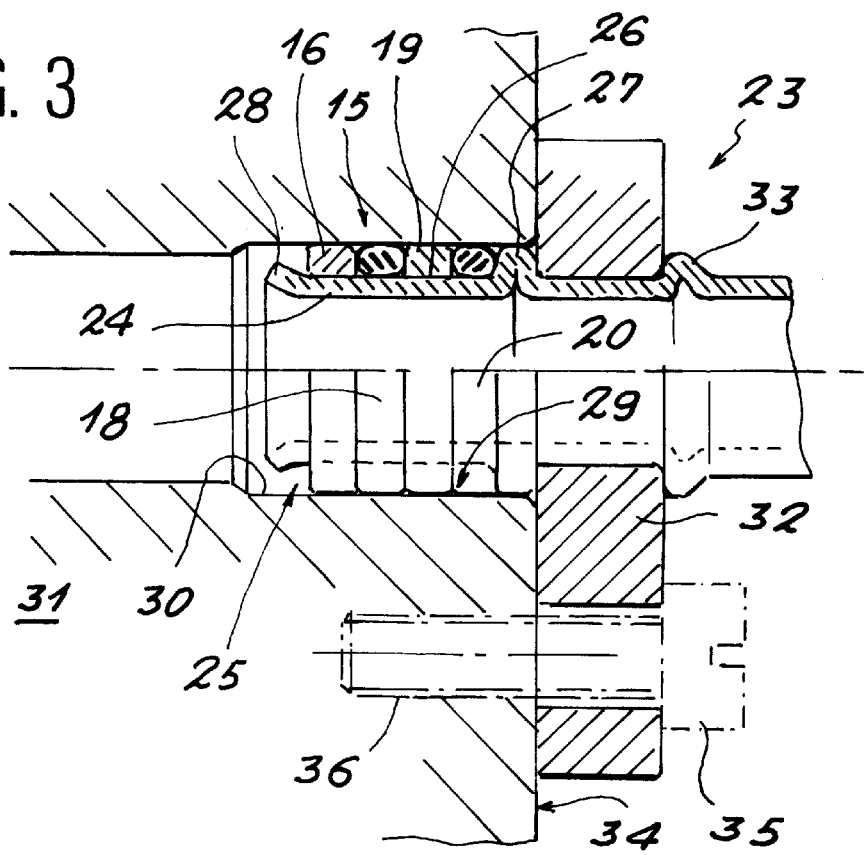
FIG. 3 is a partly sectional view of a component/pipe assembly according to an embodiment of the invention comprising a gasket according to FIG. 2.

FIG. 3 shows a component/pipe assembly 23 comprising a gasket 15 according to FIG. 2 provided with annular rings 16 and 19, the inner faces of which cooperate by soft friction, having an inner shape 24 complementary to the outer shape 25 of the aluminum pipe 26, onto which they are slipped together with the collars 18 and 20.

The gasket 15 is not secured longitudinally, so as to allow it to slide slightly on the pipe on one side, but is nevertheless blocked in its travel by a fold 27 on one side and by a projecting part 28 on the other side.

Such an arrangement is conducive to leaktightness.

The cylindrical outer faces of the rings 16 and 17 cooperate frictionally with the inner face 29 of the cylindrical bore 30 of the component 31.

A fastening plate 32 secured to the pipe connector 26 by means of the folds 27 and 33 on either side of the plane outer faces of the plate 32 makes it possible to secure the pipe integral with the plate to the plane outer face 34 of the component, for example by means of a throughbolt 35 screwed into a bore 36 of said component.

Figure 4:
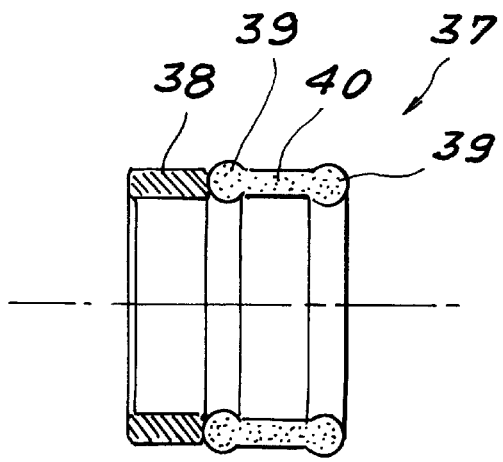
FIG. 4 is a view in longitudinal section of a composite gasket according to another embodiment of the invention.

The invention also covers embodiments in which the collar made from elastomeric material is not an O-ring, but is a gasket having at least one beveled surface, for example a gasket of octagonal cross section, and/or is a gasket with a special profile, those where the composite gasket comprises three or more collars made from elastomeric material, and/or three or more rings made from rigid material. The gasket with a special profile is, for example, a gasket 37 (see FIG. 4) provided with a cylindrical ring 38 made from metal or from rigid material and with a collar made from elastic material in the form of an elongate 8, or of elongate dumbbells comprising two toric end portions 39 and a cylindrical elongate junction part 40 parallel to the axis of the gasket.

Figure 5:
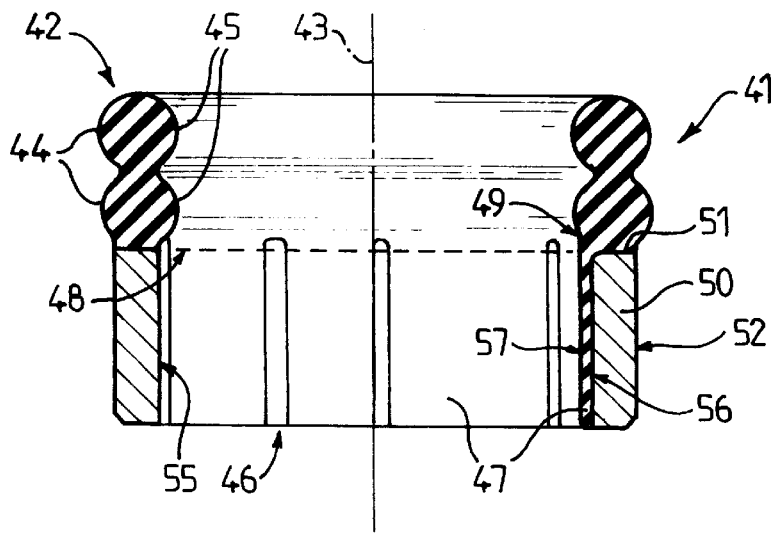
FIG. 5 is a view in longitudinal section of a composite gasket according to another embodiment.
Figure 6:
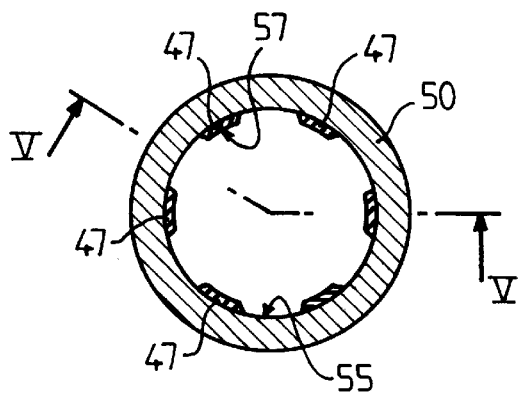
FIG. 6 is a cross-sectional view according to VI—VI of the gasket of FIG. 5.

FIGS. 5 and 6 show another embodiment of a gasket 41 according to the invention.

The gasket 41 comprises a collar 42 made from elastomeric material and formed partially by a double O-ring substantially in the form of an elongate 8 parallel to the axis 43 of the gasket.

More generally, the collar 42 comprises, on the same side as the gasket relative to the axis 43, two sealing or pressure lines or surfaces 44 and 45 respectively, located two by two in the same cylindrical plane of axis 43 and formed by the bulged parts of the 8.

Said collar 42 is designed to cooperate, on the one hand, with the outer face of the connector and, on the other hand, with the inner face of the component.

The collar 42 comprises, furthermore, an end part 46 in the form of portions 47 of a cylinder of small thickness which are arranged angularly, for example six portions in the form of lamellae which are parallel to and are located on the same side as the axis 43 and are inscribed within an annular cylinder and which are attached at one end 48 to the lower face 49 of the 8-shaped collar part with which they are integral.

The gasket 41 also comprises a ring 50 made from rigid material, in the form of a cylindrical sleeve, which is of the type described with reference to FIG. 1 and of which the junction end 51 with the 8-shaped part of the collar is, for example, straight.

The outer surface 52 of the ring is designed to cooperate by soft friction with the inner face 53 (see FIG. 7) of a bore pierced in the component 54, and the inner face 55 of said ring cooperates with the outer faces 56 of the portions 47 in the form of lamellae, the inner faces 57 of which themselves cooperate frictionally with the connector 58 of the pipe.

More specifically, the portions 47 form lamellae extending, for example, over the entire height of the ring 50 and according to arcs of a circle of between 5° and 50°, for example of 10°.

The angular distribution of the portions 47 is symmetrical and varies as a function of the number of portions which may be between two and twenty, for example three, four, six or eight.

The thickness of the portions 47 in the form of lamellae is, for example, between 0.3 mm and 2 mm, for example 0.5 mm.

Figure 7:
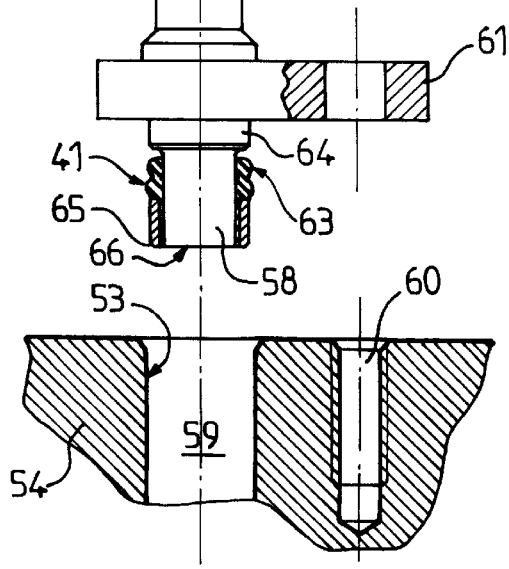
FIG. 7 is a partly sectional view of a component/pipe assembly according to another embodiment of the invention, comprising a gasket according to FIG. 5.

FIG. 7 illustrates a component/pipe assembly comprising the component 54 provided with an orifice 59, formed by the cylindrical bore of the inner face 53, and of an orifice 60 for securing to a flange 61 by means of a screw.

The assembly comprises a pipe 62 integral with the flange and provided with the connector 58, onto the end of which the gasket 41 described with reference to FIGS. 5 and 6 is simply slipped frictionally.

The outer end 63 of the part in the form of an elongate 8 comes into abutment on a protuberance 64 of the flange, the end 65 of the ring itself coming flush with the end edge 66 of the pipe connector.

Figure 8:
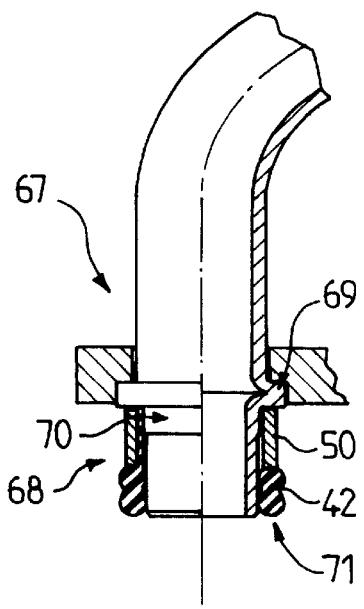
FIG. 8 shows another embodiment of a pipe with a gasket belonging to a component/pipe assembly according to the invention.

FIG. 8 shows another embodiment of a connector according to the invention with a gasket 68, of the type described with reference to FIG. 5, but inverted through 180° relative to its arrangement described with reference to FIG. 7.

More specifically, the connector 67 comprises a stop skirt 69, a cylindrical zone 70 of an extra thickness of 1 to 3 tenths of a millimeter, designed to cooperate forcibly with the end of the ring 50, covered internally by the elastomeric lamellae of the gasket, and the actual connector designed to cooperate with the end 71 in the form of an elongate 8 of the collar 42 which is located completely on the same side as the end of the connector.

The end of the rigid ring is in abutment on the skirt 69.

Figure 9:
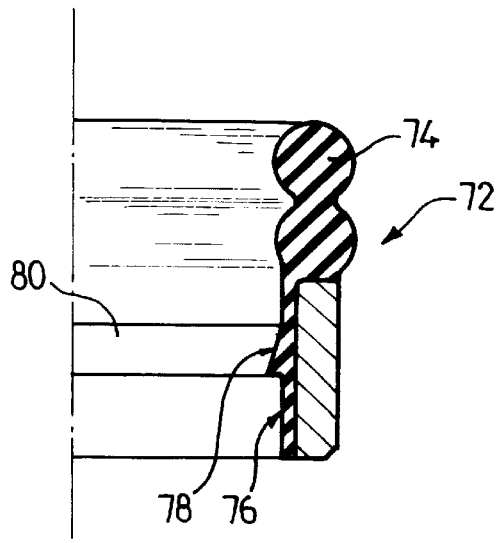
FIGS. 9, 10 and 11 show, in partial cross section, three other embodiments of the gasket according to the invention.
Figure 10:
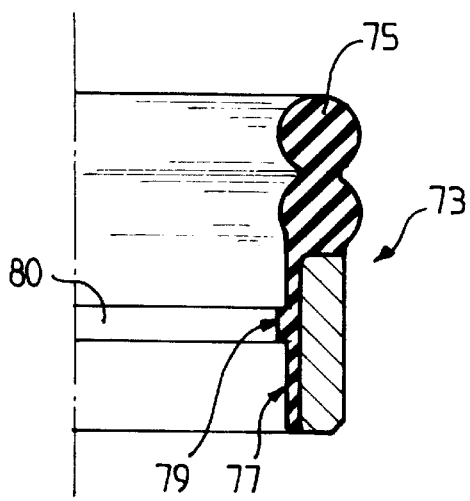
Figure 11:
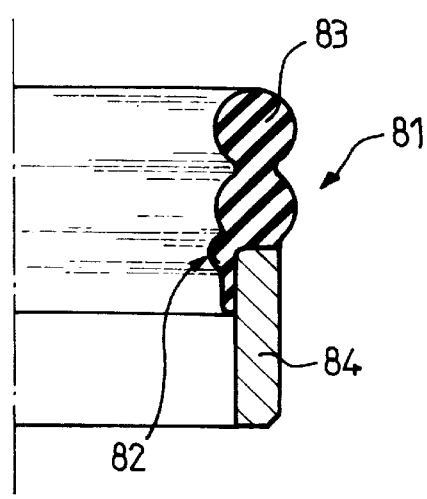

FIGS. 9, 10 and 11 illustrate three other embodiments of a gasket according to the invention which are provided with different end portions.

FIGS. 9, 10 show a gasket 72, 73 with a collar 74, 75 respectively provided with an annular end portion 76, 77 comprising a projecting part 78, 79 of rounded triangular 78 or rectangular 79 cross section, capable of cooperating with an inner annular groove 80 made in the outer face of the connector.

FIG. 11 shows a gasket 81 with an annular inner protuberance 82 located in the lower part of the collar 83 over a distance smaller than (for example, 1/10th, 1/4 or 1/3) or equal to the height of the ring 84 and capable of blocking the gasket removably on the connector.

Such an arrangement allows easier assembly due to this temporary securing of the gasket.

It goes without saying and, moreover, results from the foregoing that the present invention is not limited to the embodiments which have been more particularly described.

What is claimed is:

1. A composite gasket for a rigid pipe connector capable of being inserted into a component provided with a connecting orifice in the form of a cylindrical bore, for connection to said connector, said gasket comprising at least one collar made from elastomeric material, said collar being arranged around an axis, and at least one ring made from rigid material, said ring being of annular shape and being located entirely on one side and in the axial prolongation of the collar, said ring having an axis coinciding with the axis of the collar, and having an outer surface capable of cooperating by soft friction with the inner face of the connecting orifice, said ring being in the form of a cylindrical sleeve having a longitudinal dimension between 1.5 times and 5 times the radial thickness of said ring and having an inner surface capable of cooperating by soft friction with the outer face of the connector directly or via an end part of the collar, said composite gasket being designed to be slipped frictionally on the connector, said collar being fixed to the ring, and having a junction end with the ring of a shape complementary to a corresponding junction end of said ring with said collar, so as to match at least partially the shape of the edge of said collar.

2. The gasket according to claim 1, wherein it comprises two collars made from elastomeric material and located respectively on either side of the ring.

3. The gasket according to claim 1, wherein it comprises two rings made from rigid material.

4. The gasket according to claim 3 wherein the rings are connected to one another by means of one of said collars made from elastomeric material, said one of said collars being fixed with said rings, at a respective initial end of said rings, at least one of said rings at the other end of said one of said rings, the other one of said collar made from elastomeric material.

5. The gasket according to claim 1, wherein the collar is an o-ring gasket.

6. The gasket according to claim 1, wherein the collar made from elastic material, has a cross section substantially in the form of a FIG. 8.

7. The gasket according to claim 1, wherein the collar made from elastic material has a cross section in the form of a dumbbell comprising two toric end portions and a cylindrical elongate junction part.

8. The gasket according to claim 1, wherein the collar comprises an end part in the form of portions of an annular cylinder which are arranged angularly around the axis of the gasket, parallel to each other, and which cooperate with the inner face of the ring.

9. The gasket according to claim 8, wherein the portions form lamellae extending over the entire height of the ring and according to arcs of a circle of between 5° and 50°, said lamellae being distributed uniformly.

10. The gasket according to claim 1, wherein the collar comprises an annular end portion provided with a projecting part of rounded triangular or rectangular cross section capable of cooperating with an inner annular groove made in the outer face of the connector.

11. A component/pipe assembly comprising:
a component provided with a connecting orifice in the form of a cylindrical bore having an inner face,
a rigid pipe connector having an outer face inserted within said connecting orifice,
a composite gasket comprising at least one collar made from elastomeric material, said collar being arranged around an axis, and at least one ring made from rigid material, said ring being of annular shape and being located entirely on one side in the axial prolongation of the collar with an axis coinciding with the axis of the collar, said ring having an outer surface cooperating by soft friction with the inner face of the connecting orifice, said ring being in the form of a cylindrical sleeve having a longitudinal dimension between 1.5 times and 5 times the radial thickness of said ring and having an inner surface cooperating by soft friction with the outer face of the rigid pipe connector either directly or via an end part of the collar, the gasket having been slipped frictionally on the connector, said collar being fixed to the ring and having a junction end with the ring of a shape complementary to a corresponding junction end of said ring with said collar so as to match at least partially the shape of the edge of said collar and, a fastening plate for securing the pipe to the component.

12. The component/pipe assembly according to claim 11, wherein the rigid pipe connector comprises a first part projecting relative to the outer face of the rigid pipe connector which is located at a distance from the end of said rigid pipe connector, and a second part projecting relatively to the outer face of the rigid pipe connector and located at the end of said rigid pipe connector, said projecting parts forming longitudinal blockage stops on either side of the gasket on the pipe connector.

13. The component/pipe assembly according to claim 11, wherein the collar has an annular end portion provided with a projecting part of rounded triangular or rectangular cross section and wherein the rigid pipe connector comprises at least one annular groove, into which at least part of the said collar is inserted.

14. The component/pipe assembly according to the claim 11, wherein the rigid pipe connector comprises a stop skirt and cooperates with the end of the collar which is located completely on the same side as the external end of the rigid pipe connector.

* * * * *